(12) United States Patent
McLane

(10) Patent No.: US 6,761,224 B2
(45) Date of Patent: Jul. 13, 2004

(54) EQUINE SUPPORT PAD WITH INTEGRAL FROG SUPPORT

(76) Inventor: Myron E. McLane, 49 Winter St., Somerset, MA (US) 02726

( * ) Notice: Subject to any disclaimer, the term of this patent is extended or adjusted under 35 U.S.C. 154(b) by 205 days.

(21) Appl. No.: 10/080,035

(22) Filed: Feb. 21, 2002

(65) Prior Publication Data

US 2003/0155132 A1 Aug. 21, 2003

(51) Int. Cl.[7] ............................. A01L 7/02; A01L 5/00
(52) U.S. Cl. ............................. 168/14; 168/24; 168/26
(58) Field of Search ............................ 168/14, 26, 28, 168/12, 13, 24, 27

(56) References Cited

U.S. PATENT DOCUMENTS

| | | | | |
|---|---|---|---|---|
| 268,605 A | * | 12/1882 | Bane | 168/28 |
| 460,459 A | * | 9/1891 | Borrett | 168/28 |
| 643,246 A | * | 2/1900 | Gale | 168/28 |
| 828,495 A | * | 8/1906 | Millard | 168/26 |
| 912,813 A | * | 2/1909 | Cleary | 168/28 |
| 2,191,834 A | * | 2/1940 | Slack | 168/28 |
| 3,513,915 A | * | 5/1970 | Sherman | 168/4 |
| 4,513,825 A | * | 4/1985 | Murphy | 168/12 |
| 4,794,991 A | * | 1/1989 | Honderich | 168/26 |
| 5,002,133 A | * | 3/1991 | Rybak | 168/4 |
| 5,439,062 A | * | 8/1995 | Ovnicek | 168/14 |
| 6,401,828 B1 | * | 6/2002 | Rafeld | 168/12 |

* cited by examiner

Primary Examiner—Son T. Nguyen
(74) Attorney, Agent, or Firm—Alix, Yale & Ristas, LLP

(57) ABSTRACT

An equine support pad with integral frog support comprises a flat or wedge pad integrally molded with a frog support. The support pad is open surrounding the triangular frog support to permit cleaning of the hoof. The support pad and frog support are molded from a substantially non compressible material that flexes in response to weight. Thus, the device effectively shifts weight bearing from the hoof wall to the frog while permitting the hoof to breathe and promoting normal blood flow in the foot and affording complete support of the bony column of the digit.

14 Claims, 4 Drawing Sheets

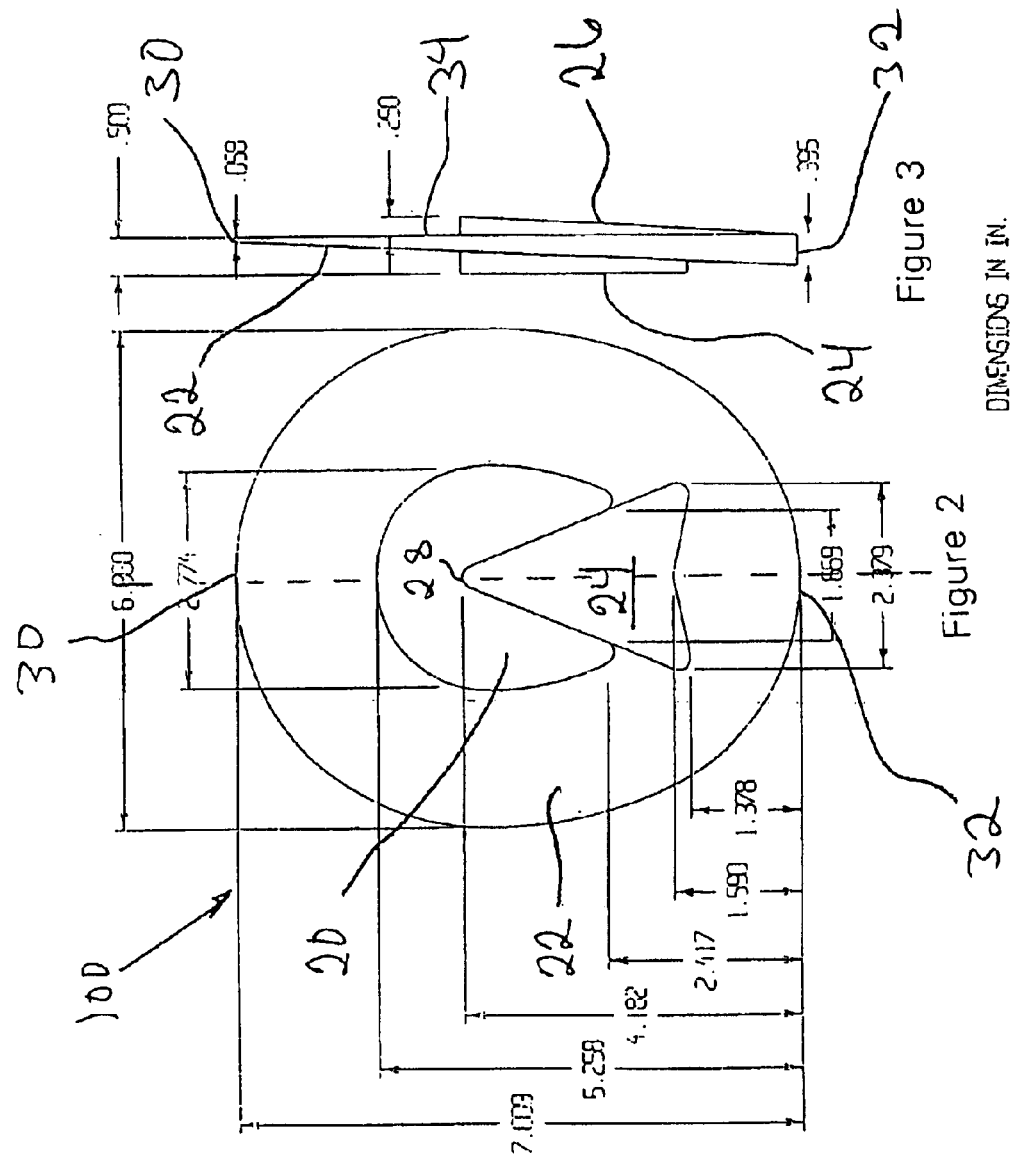

EQUINE SUPPORT PAD WITH INTEGRAL FROG SUPPORT

BACKGROUND OF THE INVENTION

1. Field of the Invention

This invention relates generally to devices and methods used in the treatment of equine lameness, and more particularly to those devices and methods directed to shifting at least some of the weight of the animal to the frog portion of the foot.

2. Description of the Related Art

Horse owners, farriers and large animal veterinarians are familiar with lameness in horses. The most common causes of lameness are laminitis, underrun heels, quarter cracks and related conditions such as road founder. Equine laminitis is a disorder of the pedal laminae that form the supportive bond between the hoof and third phalanx. Treatment of lameness in horses typically involves some form of special shoeing and/or treatment of the feet of the horse to alleviate pain, shift weight away from painful areas of the foot, support the foot to halt deterioration and promote healing.

Since foot support appears to satisfy a number of treatment goals, namely partial alleviation of pain, the slowing of further movement of the phalanx (in laminitis), and healing of cracked hooves, a number of interesting remedial devices and methods have been created. For example, one of the more common devices is known as the "heart bar shoe". This device looks similar to a conventional horseshoe except for the addition of a V-shaped extension that supports the frog. Depending on the specific anatomical features of the affected foot, the nature and extent of the problem, the apex of the V-shaped extension can be raised or lowered to provide more or less frog support. Another device used for frog support is known as the "lily pad", which fits on to the heel of the affected foot but which also includes a V-shaped extension. Finally, others have suggested the use of soft pliable material to provide resilient support for the frog.

Unfortunately, because much effort has been directed toward custom-fit support systems, the complexity of such systems has increased with variable success in the alleviation of pain from one animal to another. Heart bar shoes, for example, can be applied only after careful scrutiny of the geometry of the affected foot and most often require the services of an expert farrier. In fact, improper preparation or use of these methods can actually aggravate the laminitis condition and cause greater pain for the affected animal.

The frog is a generally triangular elastic horny pad, that is situated in the space between the quarters and bars of a horse hoof. This position places the frog beneath the bony column of the equine leg, making it a convenient place to shift weight. The sole of the equine foot is slightly concave with the centrally located frog elevated relative to the horny perimeter wall of the hoof. This relative positioning requires a weight shifting apparatus to project upwardly from the horseshoe which is typically fastened to the wall of the hoof.

A horse experiencing extreme foot pain may be unable to move and/or exercise. Lack of movement seriously impedes blood flow to the horse's feet. Blood is necessary for normal growth, functioning and repair of injured tissues. Blood is pumped by the equine heart through arteries to the foot and is assisted in its return to the heart by a "pumping mechanism" in the foot. This mechanism must be present due to the position of the foot in relation to the heart.

There are no muscles in the lower leg or foot, as we find in other parts of the body, to aid in the returning venous blood to the heart. Located on both sides of each of the lateral cartilages and in the sensitive structures of the foot are large venous plexuses. Each venous plexus is made up of an extensive network of veins. The compression of these veins by the frog against the lateral cartilages acts as a pump to force the blood up the leg and back to the heart. Blood is prevented from returning to the foot by valves in the veins of the leg. This valve action creates a fluid pressure which causes the blood to exit up the leg and the plexuses to fill when the foot is raised and compressed veins open. Each time the foot bears weight, the veins are compressed. Each time the foot is raised, the veins open and blood is pushed in by the arterial pulse and gravity.

Treatment that is effective at alleviating pain permits the horse to move more normally, improving blood flow in and around the feet to aid healing. Some treatments, such as heart bar shoes, may impede the pumping action of the hoof by rigidly supporting the frog with respect to a horseshoe rigidly fixed to the peripheral wall of the hoof. Inadequate blood flow impedes healing and can lead to necrosis in the foot.

SUMMARY OF THE INVENTION

An object of the present invention is to provide a new and improved equine support pad with integral frog support that does not require the services of an expert farrier for installation.

Another object of the present invention is to provide an equine support pad and frog support that does not impede normal blood pumping through the equine foot.

A further object of the invention is to provide a new and improved equine support pad with integral frog support that alleviates foot pain by shifting weight from the hoof wall to the frog.

A yet further object of the present invention is to provide a new and improved equine support pad with integral frog support that permits access to the sole of the foot between the hoof wall and the frog.

One preferred embodiment of an equine support pad with integral frog support in accordance with the present invention comprises a wedge pad of substantially non-compressible polymer material configured for attachment between a horse hoof and a horseshoe. The pad is configured in an oval shape to generally conform to the configuration of the equine hoof. The central portion of the support pad is generally open, allowing access to the sole of the foot between the hoof wall and the frog. A frog support projects into the central opening of the pad in a generally triangular configuration that mimics the anatomy of the frog. The point of the triangular frog support is located in the middle of the opening in the pad and is generally free to move independently of the pad.

The frog support widens as it projects toward the heel end of the pad to provide a continuous substantially planar frog support surface. This triangular frog support surface is configured to project above the foot side of the pad such that the point of the triangular frog support is elevated relative to the hoof side of the pad. Conversely, the opposed ground contact face of the frog support is configured to project to the same level as the traction (bottom) surface of a horseshoe mounted to the shoe side of the pad. The flexible material of the support pad permits the frog support to flex relative to the peripheral portions of the support pad which will typically be rigidly secured to the wall of the hoof by the horseshoe and nails.

When the animal places weight on a hoof equipped with the inventive pad, the ground contact face of the frog support diverts weight away from the hoof wall to the bony column of the leg by contacting the frog. The flexible material of the pad/frog support and the open configuration around the tip of the frog support permit the frog support to flex upwardly (when delivering weight to the frog) and back (when the leg is unweighted). This movement permits and even improves blood flow in the natural pump in the equine foot.

The shoe side of the pad is configured to accommodate egg bar, straight bar and open shoes. The ground contact face of the frog support does not extend all the way to the heel end of the pad, creating an uninterrupted shoe-mounting surface around the entire periphery of the support pad opposite the hoof surface.

BRIEF DESCRIPTION OF THE DRAWINGS

FIG. 2 is a bottom schematic view of an equine support pad with integral frog support in accordance with the present invention;

FIG. 3 is a side view of the equine support pad with integral frog support of FIG. 2;

DETAILED DESCRIPTION OF THE PREFERRED EMBODIMENT

With reference to the drawings wherein like numerals represent like parts throughout the several Figures, an equine support pad with integral frog support in accordance with the present invention is generally designated by the numeral 100. The support pad comprises an oval wedge pad with an open center 20 including an integrally molded triangular frog support 25 projecting into the central opening. The support pad 100 and integral frog support 25 are molded from a dense but flexible polymer material with a preferred material being polyurethane. It is undesirable that the pad compress to any appreciable extent when exposed to the weight of the animal, which can exceed 2000 pounds. Flexibility is important to the function of the support pad, as will be further explained below.

Figure 1:
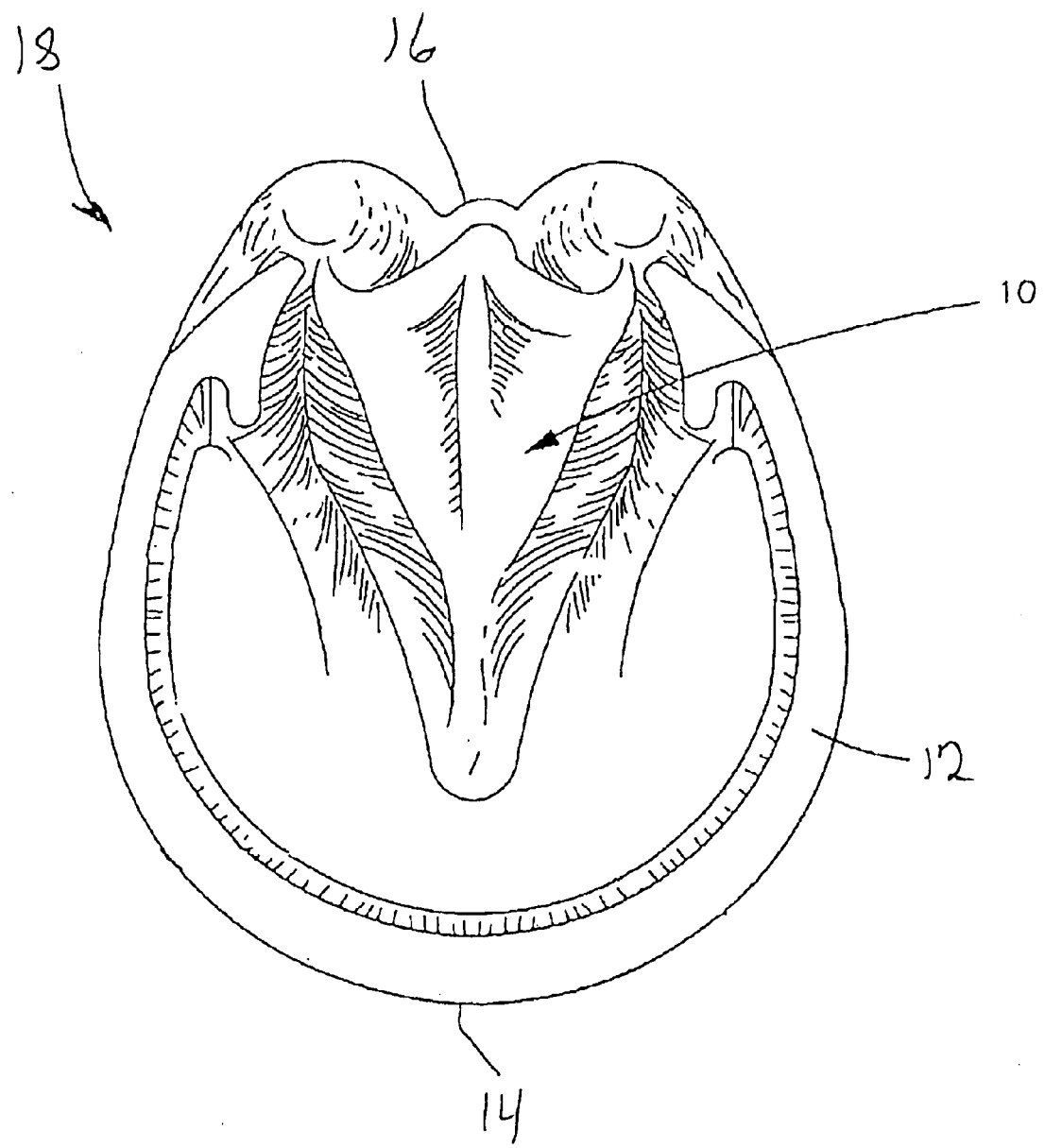
FIG. 1 is a bottom view of a representative equine foot.

FIG. 1 is a bottom view of a representative equine foot 18. A hard horny hoof wall 12 extends around the toe 14 of the foot 18. In a healthy foot, the hoof wall 12 carries the majority of the weight of the horse. Horseshoes are fixed to the horny hoof wall with nails into the hoof wall. Shoes protect the hoof wall 12 from damage and wear. A farrier typically trims the horny material of the hoof as it grows to keep the feet properly aligned with the bones of the legs. Wedge pads may be used to raise the heel 16 of the foot relative to the toe 14 to improve this foot/leg alignment which is an important aspect of the overall conformation of the horse.

In a lame foot, the hoof cannot support the weight placed on it without causing pain to the animal. It is common to apply specialized apparatus to the equine foot to shift weight bearing from the hoof to the frog 10. The frog 10 is a generally triangular horny pad projecting along the middle of the bottom of the foot from the heel 16 toward the toe 14. The horse foot is typically cup-shaped, with the frog 10 elevated relative to the hoof wall 12. To shift weight bearing to the frog 10, it is therefore necessary to construct a generally non-compressible support extending from the frog to the ground (or other support surface) on which the horse is standing.

Figures 4, 5:
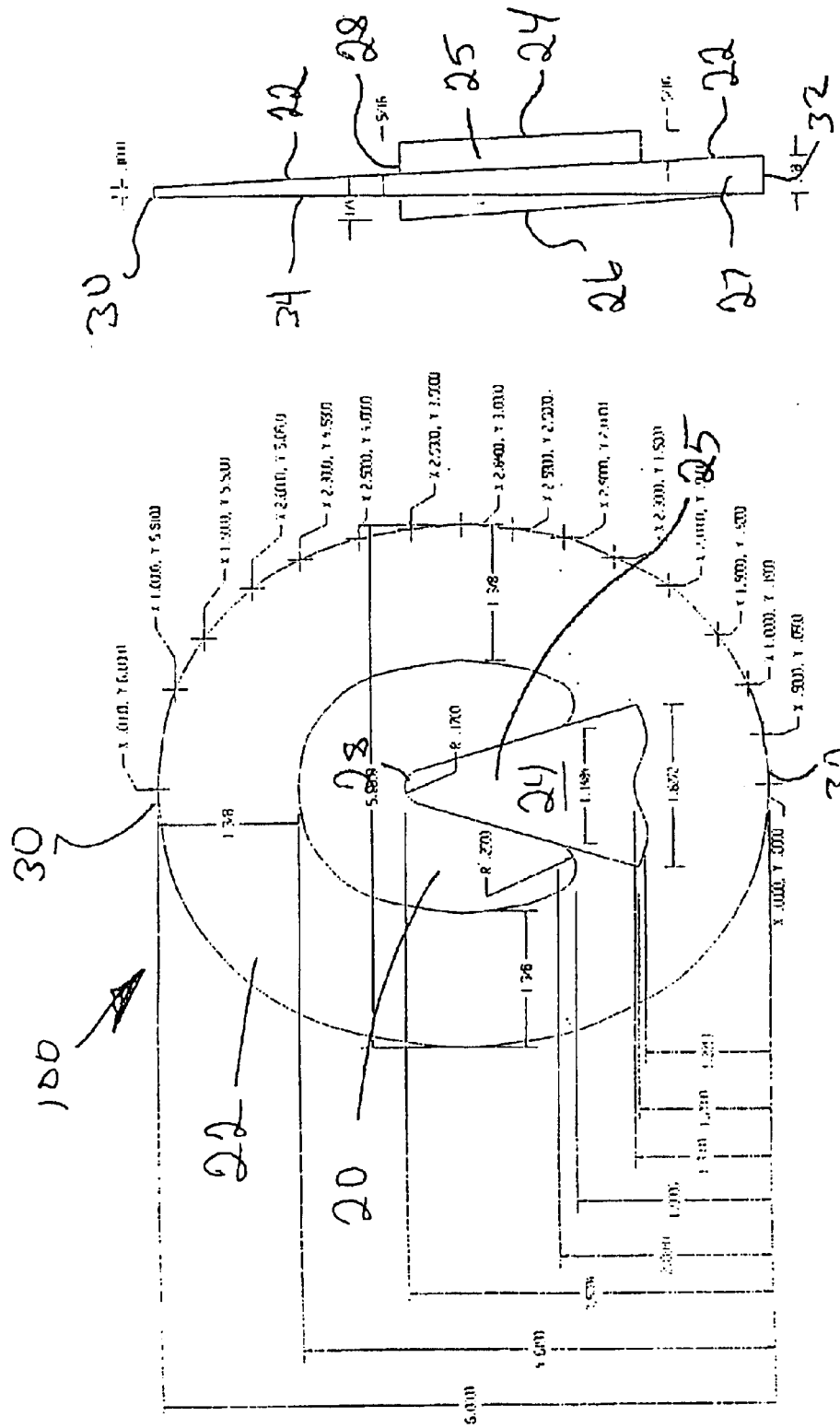
FIG. 4 is a bottom schematic view of an alternative embodiment of the equine support pad with integral frog support in accordance with the present invention.
FIG. 5 is a side view of the equine support pad with integral frog support of FIG. 4.

FIGS. 2–5 illustrate two versions of a preferred embodiment of the support pad 100. FIGS. 2 and 3 illustrate a support pad 100 configured for medium size horses, while FIGS. 4 and 5 illustrate a support pad configured for small horses. The basic function and configuration of the small and medium size pads are substantially similar and will be discussed at the same time.

Figure 6:
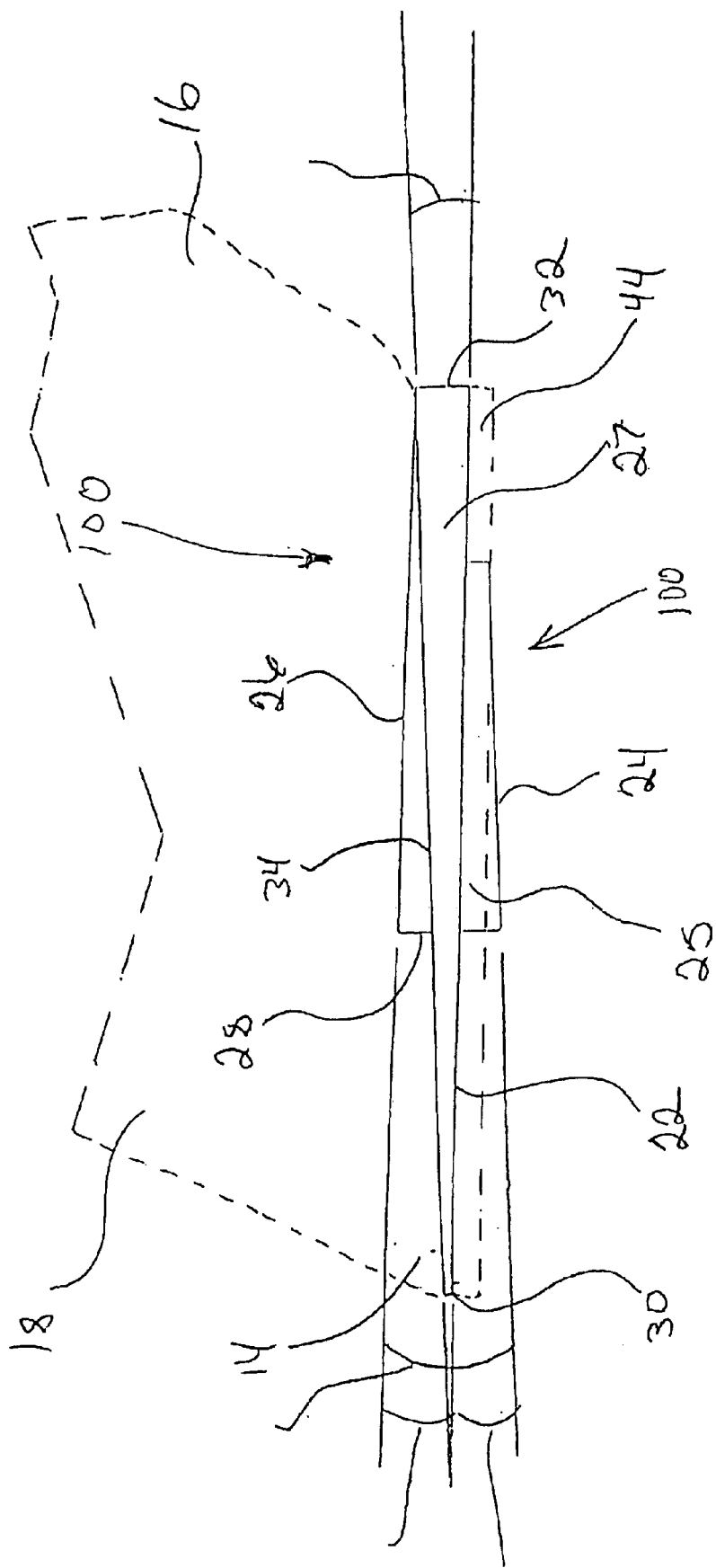
FIG. 6 is a side view of the equine support pad with integral frog support mounted between a horse hoof (shown in phantom and broken away) and a horseshoe (shown in phantom).

A preferred embodiment of the support pad with integral frog support comprises an oval-shaped wedge pad 27 having a substantially planar top or hoof surface 34 and opposite substantially planar bottom or shoe surface 22. The wedge pad 27 is configured for mounting between a horse hoof 18 and a horseshoe 44 (as illustrated in FIG. 6). The wedge pad 27 increases in thickness from the toe end 30 to the heel end 32 of the pad. This configuration tends to raise the heel and lower the toe of the horse's foot. Raising the heel and lowering the toe repositions the bones of the lower leg and reduces stress on the bones and tendons of the foot. This repositioning and tension reduction furthers the treatment of lameness by making the animal more comfortable and slowing bone movement caused by acute laminitis.

The frog support 25 is integrally molded with the wedge pad 27 but has a configuration and function independent of the pad. The frog support 25 includes an upper generally planar frog support surface 26 and a bottom generally planar ground contact surface 24. The frog support surface 26 is generally triangular, projecting from a wide heel end toward a rounded tip 28 that projects into the central opening 20. The frog support surface 26 is not coplanar with the hoof surface 34 of the pad, but angularly diverges therefrom such that the rounded tip 28 is elevated relative to the hoof surface 34. The rounded tip 28 of the triangular frog support surface 26 projects approximately one quarter of an inch above laterally adjacent portions of the hoof surface 34. This elevated position brings the frog support surface 26 into close proximity with the frog which is typically elevated relative to the wall of the hoof due to the arched or cup-shape of the foot. In the illustrated embodiments, the frog support surface 26 extends from the rounded tip 28 to the heel edge 32 of the wedge pad 27 and has an angular orientation relative to the hoof surface 34 of approximately three degrees (3°). The heel end of the frog support surface 26 meets the hoof surface 26 or is slightly elevated with respect to the hoof surface 34.

A ground contact surface 24 of the frog support is opposite the frog support surface 26. The ground contact surface 26 is generally planar and also generally triangular, although shortened as it projects toward the heel end 32 of the wedge pad 27 (as best seen in FIGS. 2 and 4. This shortened configuration allows the shoe surface 22 to extend around the entire circumference of the (bottom) shoe surface 22 of the wedge pad. A continuous shoe surface 22 permits use of egg bar and straight bar horseshoes as well as conventional open horseshoes in conjunction with the support pad with integral frog support 100.

In the embodiment illustrated in FIGS. 2 and 3, the ground contact surface 24 has an angled relationship relative to the shoe surface 22. This angled relationship is smaller than that of the frog support surface 26 relative to the hoof surface 34 of the wedge pad and is on the order of one to two degrees (1–2°). The frog support has a wedge configuration such that it is thickest at its rounded tip 28. This thickened forward portion of the frog support 25 is configured to project above the hoof surface 34 and below the bottom of a shoe fixed to the shoe surface 22. This thickened forward portion shifts weight from the hoof wall to the frog.

The embodiment of FIGS. 4 and 5 is slightly different in that the ground contact surface 24 is generally parallel to the shoe surface 22. In this embodiment, the ground contact surface 24 projects below the shoe surface 22 by a distance of approximately 5/16 of an inch. This ensures that the ground contact surface will impact the ground before a shoe fixed to the shoe surface 22. The frog support surface 26 diverges from the hoof surface 34 so the frog support 25 still has a wedge configuration with its thickest point at the rounded tip 28.

It will be understood that the frog support 25 should not compress under the weight of the horse, e.g., 1,000 to over 2,000 pounds. If the frog support were to compress, weight would still be borne by the incompressible hoof wall and shoe combination. Thus, it can be seen that a soft or compressible frog support fails to shift weight bearing and can thus serve little or no therapeutic purpose in the treatment of equine lameness.

FIG. 6 illustrates the equine support pad with integral frog support 100 mounted between a horse hoof 18 and a horseshoe 44 (both shown in phantom). From the illustration, it can be seen that the frog support face 26 projects upwardly from the hoof surface 34 while the ground contact face 24 projects below the traction surface of the horseshoe 44. Weight placed on the hoof 18 will compress the frog support 25 between the ground and the frog, effectively transferring a portion of the weight on the foot to the frog and ultimately to the bony column of the leg. This upward pressure on the frog also compresses the venous plexuses in the foot. Removing weight from the foot 18 relieves pressure on the frog support 25 and allows the venous plexuses to re-fill with blood. The open configuration of the equine support pad with integral frog support 100 permits the frog support 25 to move substantially independently from the wedge pad 27.

The generally open center 20 of the support pad and integral frog support 100 permit cleaning of the hoof and prevent disease by permitting the hoof to breathe naturally. The support pad with integral frog support 100 is available in sizes for small, medium and large animals. Each size can be custom fit to the particular animal by lining up the frog support with the frog of the hoof and tracing the outline of the hoof on the hoof surface 34 of the wedge pad 27. The periphery of the pad 27 is then cut and the pad installed such that the tip 28 of the frog support 25 is slightly rearward or posterior of the tip of the frog (see FIG. 1).

The open configuration of the support pad and integral frog support 100 permits the tip 28 to flex during movement of the animal, assisting the blood pumping function in the equine foot. It can be seen that the forward projecting portion of the frog support 25 is surrounded toward the toe end 30 and laterally by the central opening 20. The flexible polymer material is deflected upwardly when shifting weight to the frog and downwardly away from the frog when the leg is un-weighted.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A support pad for an equine foot, said support pad comprising:
    a bi-laterally symmetrical oval pad having a toe end, a heel end opposite the toe end, a substantially planar hoof surface, a substantially planar opposite shoe surface, and defining a central opening through said hoof and shoe surfaces; and
    a generally triangular frog support formed as one piece with the pad and having a generally planar frog support face, an opposite ground contact face, a rounded tip of the frog support projecting toward said toe end from the heel end of the pad such that said tip is positioned in said central opening and centered on a line drawn from said toe end to said heel end to separate said support pad into equal lateral portions,
    wherein said tip is surrounded by said central opening toward said toe end and laterally relative to said line.

2. The support pad of claim 1, wherein said oval pad is a wedge pad tapering from a first thickness at the heel end to a second thickness at the toe end, said second thickness being less than said first thickness such that said hoof surface and shoe surface have an angular orientation relative to each other.

3. The support pad of claim 2, wherein said frog support face diverges from said hoof surface such that the frog support face at said tip is elevated relative to laterally adjacent portions of said hoof surface.

4. The support pad of claim 3, wherein said frog support face at said tip is elevated relative to laterally adjacent portions of said hoof surface by a distance of approximately 0.25 inches.

5. The support pad of claim 3, wherein said ground contact face has an angular orientation relative to said frog support face such that said frog support is thickest at said tip and tapers toward the heel end of said support pad.

6. The support pad of claim 1, wherein said frog support face extends from said tip to the heel end of said support pad and said ground contact face extends from said tip toward said heel end, said ground contact face terminating at least one inch from said heel end such that said shoe surface is continuous around the entire periphery of said support pad.

7. The support pad of claim 1, wherein said ground contact face at said tip is approximately five sixteenths of an inch below laterally adjacent portions of said shoe surface.

8. A combination of a horseshoe and support pad, said support pad comprising:
    a bilaterally symmetrical oval pad having a toe end, a heel end opposite the toe end, a substantially planar hoof surface, a substantially planar opposite shoe surface surrounding the entire periphery of said pad, said pad defining a central opening through said hoof and shoe surfaces;
    a generally triangular frog support formed as one piece with the wedge pad and having a generally planar frog support face, an opposite ground contact face, a rounded tip of the frog support projecting toward said toe end from the heel end of the wedge pad such that said tip is positioned in said central opening and centered on a line drawn from said toe end to said heel end to separate said support pad into equal symmetrical lateral portions; and
    a horseshoe mountable to said shoe surface, said horseshoe having a traction face and a mounting face,
    wherein said tip is surrounded by said central opening toward said toe end and laterally relative to said line.

9. The combination of claim 8, wherein said horseshoe has a configuration selected from the group consisting of egg bar, straight bar, or open shoe.

10. The combination of claim 8, wherein said ground contact surface projects to the ground surface of said traction surface when said horseshoe is mounted to said shoe surface.

11. The combination of claim 8, wherein said frog ground contact face has an angular orientation relative to said frog support face such that said frog support is thickest at said tip and tapers toward the heel end of said support pad.

12. The combination of claim 8, wherein said oval pad is a wedge pad tapering from a first thickness at the heel end to a second thickness at the toe end, said second thickness being less than said first thickness such that said hoof surface and shoe surface have an angular orientation relative to each other.

13. The combination of claim 8, wherein said frog support face diverges from said hoof surface such that the frog support surface at said tip is elevated relative to laterally adjacent portions of said hoof surface.

14. The combination of claim 13, wherein said frog support surface at said tip is elevated relative to laterally adjacent portions of said hoof surface by a distance of approximately 0.25 inches.

* * * * *

UNITED STATES PATENT AND TRADEMARK OFFICE
CERTIFICATE OF CORRECTION

| | |
|---|---|
| PATENT NO. | : 6,761,224 B2 |
| DATED | : July 13, 2004 |
| INVENTOR(S) | : McLane |

Page 1 of 1

It is certified that error appears in the above-identified patent and that said Letters Patent is hereby corrected as shown below:

<u>Column 6,</u>
Lines 56 and 59, delete "wedge".

Signed and Sealed this

Twelfth Day of April, 2005

JON W. DUDAS
*Director of the United States Patent and Trademark Office*